United States Patent [19]

Weintraub et al.

[11] Patent Number: 4,693,419
[45] Date of Patent: Sep. 15, 1987

[54] AUTOMATIC CONTROL APPARATUS AND METHOD FOR SPRINKLING WATER OVER A PREDETERMINED AREA

[75] Inventors: Marvin H. Weintraub, West Bloomfield; Donald R. Bernier, Lake Orion; Larry Cameron, Sterling Heights, all of Mich.

[73] Assignee: Water Sentry, Inc., Southfield, Mich.

[21] Appl. No.: 317,334

[22] Filed: Nov. 2, 1981

[51] Int. Cl.⁴ .............................................. A01G 25/16
[52] U.S. Cl. ....................................... 239/63; 47/48.5; 137/78.3
[58] Field of Search ............... 47/48.5; 137/78.2, 78.3; 239/1, 63, 64, 66, 67, 70

[56] References Cited

U.S. PATENT DOCUMENTS

| | | | |
|---|---|---|---|
| 2,578,981 | 12/1951 | Parker | 299/27 |
| 2,611,643 | 9/1952 | Higgins | 299/25 |
| 2,695,976 | 11/1954 | Hasenkamp | 315/76 |
| 2,721,101 | 10/1955 | Richard, Jr. | 299/25 |
| 2,737,615 | 3/1956 | Roby, Jr. et al. | 317/141 |
| 2,943,245 | 6/1980 | Ohlheiser | 317/149 |
| 3,195,816 | 7/1965 | Mercer | 239/63 |
| 3,197,699 | 7/1965 | Johansen | 324/65 |
| 3,224,676 | 12/1965 | Rauchwerger | 239/64 |
| 3,590,335 | 6/1971 | Tetar | 317/148.5 |
| 3,626,286 | 12/1971 | Rauchwerger | 324/61 R |
| 3,905,551 | 9/1975 | de la Chevreuere | 239/63 |
| 4,197,866 | 4/1980 | Neal | 239/63 X |

FOREIGN PATENT DOCUMENTS 853284 11/1960 United Kingdom .

Primary Examiner—Andres Kashnikow
Attorney, Agent, or Firm—Basile Weintraub Hanlon

[57] ABSTRACT

An automatic control apparatus and method for sprinkling water over a predetermined area includes a control apparatus having first and second sensors disposed underground within the predetermined area, with the first sensor being disposed in a horizontal orientation immediately below the plant root level and the second sensor being disposed in a horizontal position a predetermined distance below the first sensor. The predetermined distance between the first and second sensors is selected to provide a measurement of the wilt-point moisture content of the type of soil found within the predetermined area. The first and second sensors are provided to measure the impedance of the soil therebetween, with the impedance being proportional to the moisture content of the soil. The output of the first and second sensors is compared with a predetermined electrical reference value established for the wilt-point moisture content of the type of soil found within the predetermined area. When the moisture content detected by the sensors is below the wilt-point, a comparator energizes a water control valve connected to a source of water to disperse water over the area until the desired wilt-point moisture content is achieved. In an alternate embodiment, the control apparatus is adapted for use in a multi-zone sprinkler system and includes a timer providing first and second predetermined time periods. During the first time period, the sensors are operative to control the application of water to the predetermined area; while during the second time period, the outputs of the sensors are inhibited to enable the water control valve to index to the next zone.

1 Claim, 4 Drawing Figures

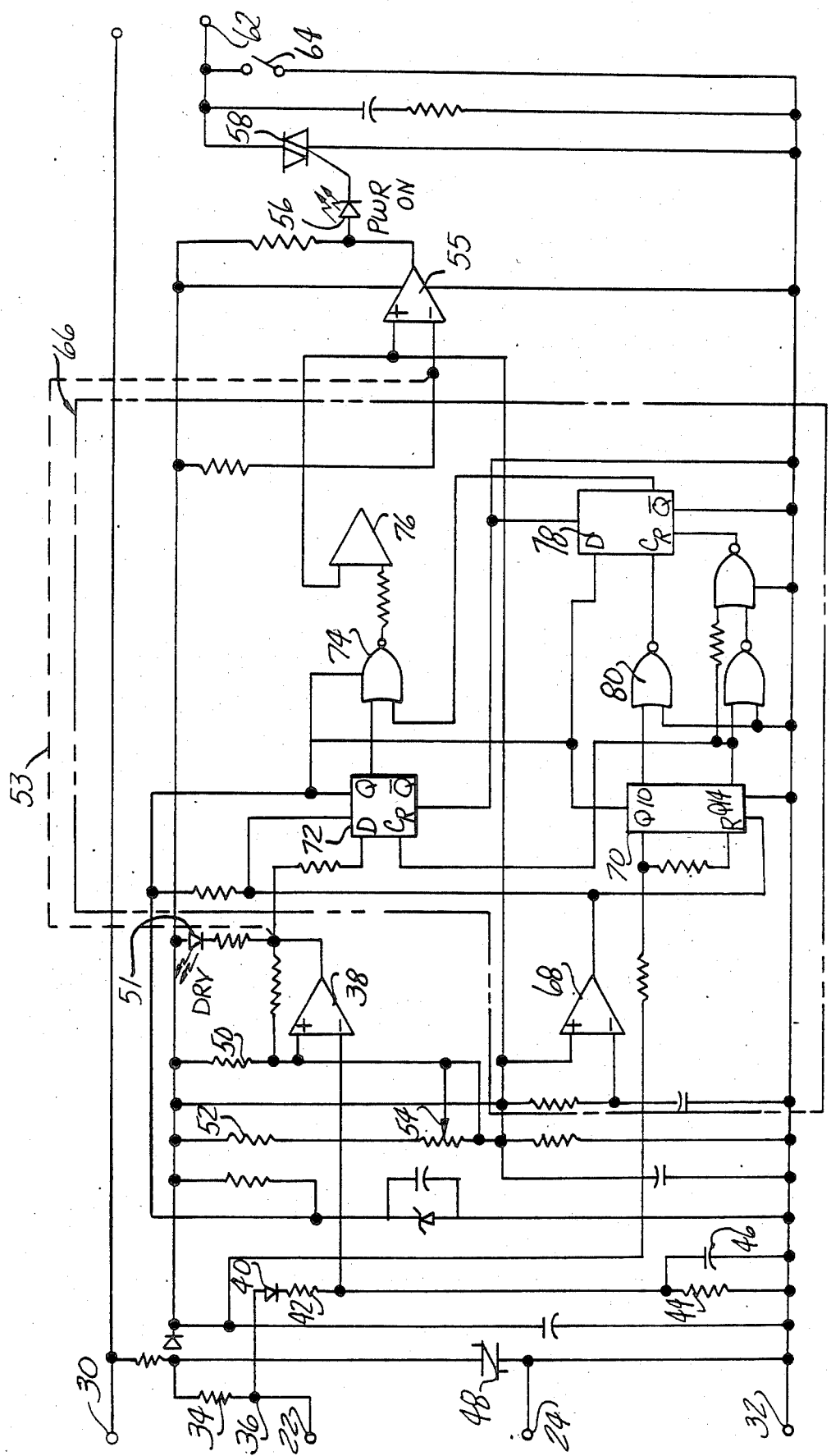

AUTOMATIC CONTROL APPARATUS AND METHOD FOR SPRINKLING WATER OVER A PREDETERMINED AREA

BACKGROUND OF THE INVENTION

1. Field Of The Invention

This invention relates, in general, to water sprinkling systems and, more specifically, to electrical control apparatus for automatically controlling the release of water in a water sprinkling system.

2. Description Of The Prior Art:

It is well known to water lawns, plants, crops, etc., by use of an irrigation or sprinkling system in which water is admitted through a control valve to a plurality of pipes, hoses or conduits extending over the lawn or field and subsequently through a sprinkler device attached to the end of the conduits for dispersing water over the area to be watered.

In those sprinkling systems utilizing a manually operated control valve, the control valve is left open until the soil is assumed to be sufficiently moist. This depends on guesswork and, even if efficiently handled, commonly results in over-watering thereby damaging the plants and wasting water or under-watering, again possibly damaging the plants, grass or crops.

Automatically operated valves have also been deviced for sprinkler systems in which the valve is opened to permit water to flow through the sprinklers at preset times during the day or night for a predetermined amount of time. However, such automatic control valves still suffer from indiscriminate operation without regard to the actual moisture content of the soil.

It is also known to utilize sensing devices with such automatic sprinkling systems to selectively control the energization of such sprinkling systems with respect to the actual moisture content of the soil. Such sensing devices utilize a pair of spaced probes which are placed vertically into the ground within the area to be watered. The probes measure the conductivity or resistance of the soil which is proportional to the moisture content of the soil. When the sprinkler control system is energized manually or by a master timer at a preset time during the day, the soil conductivity is measured and, if below a preset minimum value, the sprnklers are turned on until the probes detect a preset conductivity. The sprinklers are then turned off. If the soil conductivity, when measured, is above a preset minimum, indicating sufficient moisture content, the sprinkler system is not energized.

Although the latter types of sprinkler control systems provide more efficient utilization of water and a more thorough watering of the soil, they are not without drawbacks. In such sprinkler systems, the reference levels are set to ensure a saturated moisture condition in order to maximize the moisture content in the soil. This wastes water since a saturated amount of water in the soil is not necessary for efficient plant growth. Furthermore, such control systems are dependent upon the soil conditions, whether the soil is acidic or basic, and the type of water available in the area which determines the amount of water that is dissolvable in the soil. Due to the presence of various types of soil conditions within a small portion of a given area, over or under-watering can still result. Furthermore, since previously deviced sensors comprise a pair of rods placed vertically in the ground, misplacement commonly occurs. For these reasons, such automatic control systems have not found widespread use.

Thus, it would be desirable to provide a control apparatus for an automatic water sprinkler system which overcomes the problems of similar prior art sprinkler control devices. It would be desirable to provide a control apparatus for sprinkler systems which provides a precise amount of water for various types of soil conditions. It would also be desirable to provide a control apparatus for sprinkler systems which provides only the amount of water required for maximum plant growth. It would also be desirable to provide a control apparatus for sprinkler systems which can be easily added onto an existing sprinkler control system. It would also be desirable to provide a control apparatus for sprinkler systems which is usable with multi-zone, indexing-type sprinkler systems. Finally, it would be desirable to provide a control apparatus for sprinkler systems which provides proper sensor placement in the soil.

SUMMARY OF THE INVENTION

There is disclosed herein a new and improved control apparatus and method for sprinkling water over a predetermined area. The control apparatus includes first and second sensor means which are placed underground within the predetermined area to be watered, with the first sensor disposed in a horizontal orientation immediately below the plant root layer and the second sensor spaced below the first sensor a predetermined distance selected with regard to the wilt-point moisture content of the particular type of soil found in the predetermined area. The first and second sensor means are operative to measure the impedance of a resistance of the soil therebetween which is proportional to the moisture content of the soil. The impedance measured by the first and second sensor means is compared to a predetermined reference valve set for the wilt-point moisture content of the particular type of soil found within the predetermined area.

Upon energization, if the impedance measured by the first and second sensor means exceeds the predetermined reference valve, thereby indicating a moisture content below the desired wilt-point moisture content, an output means or switch is energized to operate a water control valve and disperse water over the predetermined area. The control valve is energized until the impedance of the said between the first and second sensor means equals or falls below the preset reference value thereby indicating that the wilt-point moisture content has been achieved. Sprinkling is then discontinued.

In an alternate embodiment in which the water control valve comprises a multi-zone, indexing-type valve adapted to sequentially index between a plurality of water zones, the control apparatus of the present invention includes timer means for establishing a first time period in which the water control valve is energized for a predetermined amount of time if the impedance measured by the first and second sensor means exceeds the preset reference value and a second time period in which the water control valve is de-energized for a predetermined amount of time to enable the water control valve to index to the next position or zone. This "on" and "off" cycle is repeated from zone to zone until the desired wilt-point moisture content in the soil has been achieved.

The control apparatus of the present invention overcomes many of the problems associated with similar prior art sprinkler control apparatus by providing a precise amount of water to a predetermined area without over or under-watering. By setting the control apparatus for the wilt-point moisture content of the particular soil within the predetermined area to be watered, the minimum amount of water necessary to maintain plant growth can be dispersed thereby maximizing plant growth while providing efficient water usage.

The control apparatus of the present invention is simply constructed thereby enabling its use as an add-on modification to existing sprinkler control systems. Furthermore, the control apparatus of the present invention is particularly usable with the more complex multi-zone sprinkling systems. Finally, the control apparatus of the present invention includes a unique sensor placement device which insures a proper orientation and spacing between the sensors. In addition, the placement device enables the spacng between the sensors to be precisely varied so as to adapt the control apparatus for use in all types of soils having varying wilt-point moisture contents.

BRIEF DESCRIPTION OF THE DRAWING

The various features, advantages and other uses of the present invention will become more apparent by referring to the following detailed description and drawing in which:

FIG. 4 is a schematic diagram of the control apparatus of the present invention.

DESCRIPTION OF THE PREFERRED EMBODIMENTS

Figure 1:
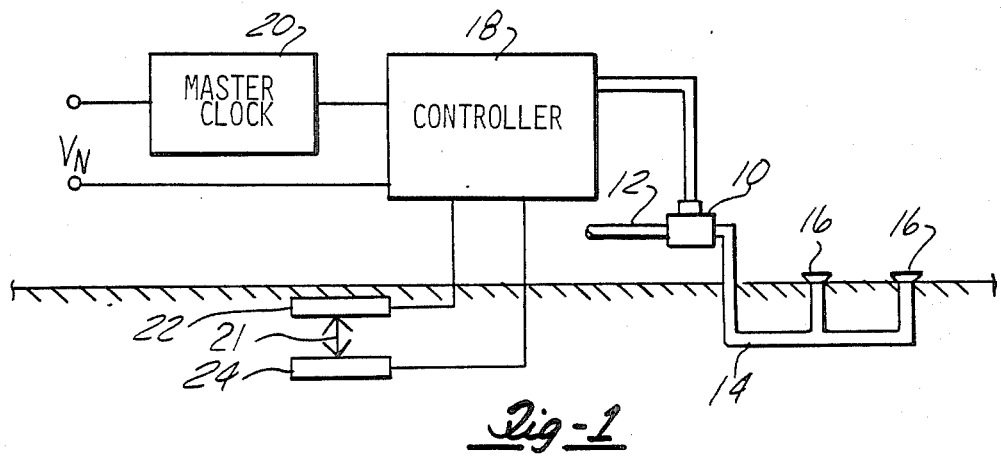
FIG. 1 is a pictorial representation of a sprinkler control system utilizing a control apparatus constructed in accordance with the teachings of the present invention.

Throughout the following description and drawing, an identical reference number is used to refer to the same component shown in multiple figures of the drawing.

Referring now to the drawing, and to FIG. 1 in particular, there is illustrated an automatic water sprinkling system. The sprinkling system includes a water control valve 10 which is connected to a source of pressurized water 12. The control valve 10 is of any conventional construction and preferably comprises an electrically operated solenoid valve which selectively opens and closes so as to control the release of water from the source 12 to a plurality of conduits 14. The conduits, which may be in the form of pipes, hoses, etc., are disposed on or buried in the ground within a predetermined area. The conduits 14 terminate in sprinkler means 16 which may be any type of sprinkling apparatus for dispersing water over a predetermined area.

A control apparatus or controller 18 is provided to selectively operate the water control valve 10 in response to the moisture content of the soil. A master timing device or clock 20 is interposed between a source of electrical power, not shown, and the controller 18 for selectively energizing the controller 18 at a predetermined time of the day or night. Preferably, the master clock 20 comprises a 24 hour clock which is settable so as to energize the controller 18 at a predetermined time each day, such as 6 o'clock in the morning and for a preset time period, such as from one to two hours.

Although a master clock is illustrated and described as the means for energizing the controller 18 at a preset time, it will also be understood that a conventional, manually-operated on-off switch may also be used to selectively connect electrical power to the controller 18, or the controller 18 may be connected directly to a source of electrical power for continuous energization.

Figure 2:
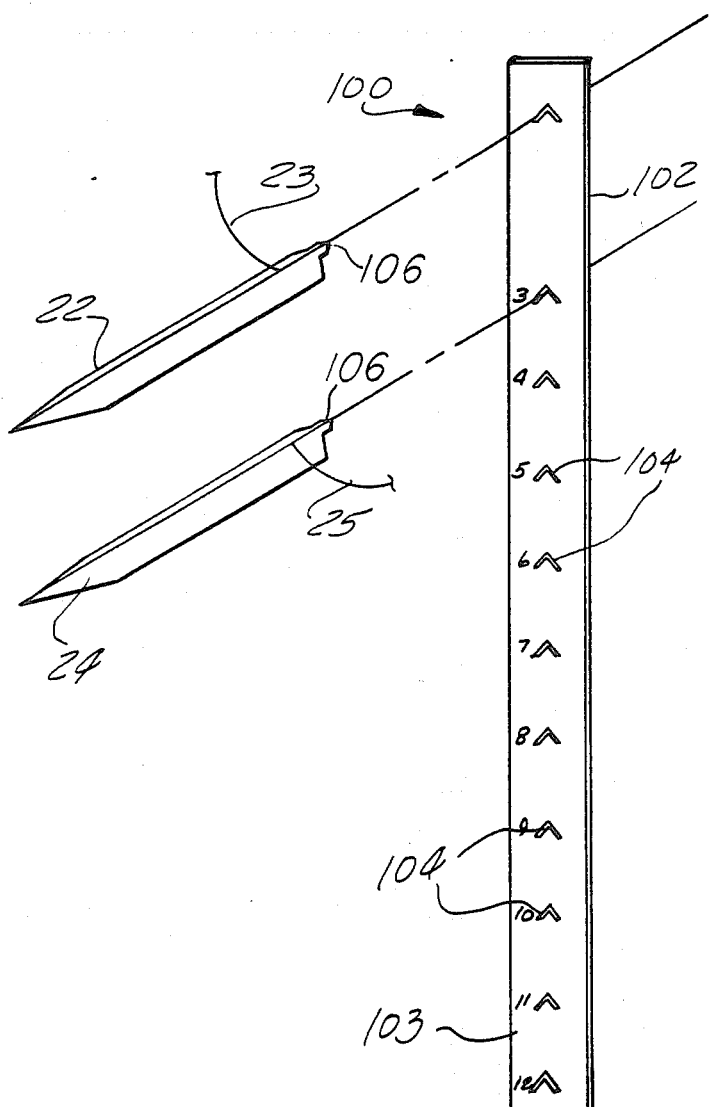
FIG. 2 is a perspective view of the mounting means for the sensing means of the present invention.

The controller 18 includes first and second sensor means 22 and 24, respectively, which are buried underground within the predetermined area to be watered and are operative to measure the impedance and/or resistance of the soil. As shown in FIG. 2, the first and second sensor means 22 and 24, respectively, are identically constructed and have an elongated strip-like, V-shaped cross section formed of depending sides disposed at a slight interior angle with respect to each other.

Alternately, the sensor means 22 and 24 may be formed in other shapes, such as helical, flat, etc., which minimize or prevent movement of the sensor means 22 and 24 in the soil.

The first and second sensor means 22 and 24 are formed of any suitable electrically conductive material, such as copper, carbon, steel. Preferably, the first and second sensor means 22 and 24 are formed of a corrosion resistant material, such as stainless steel.

According to the teachings of the present invention, the first and second sensor means 22 and 24 are placed under ground in a centrally located position within the driest or sunniest part of the area to be watered, with the first sensor 22 disposed in a horizontal orientation immediately below the plant root layer. The second sensor 24 is similarly positioned in a horizontal orientation a predetermined distance 21 below the first sensor 22. The predetermined spacing 21 between the first and second sensors 22 and 24 is selected with regard to the wilt-point moisture content of the particular soil found within the area to be watered. In a sandy type soil, it has been found that a spacing of approximately three inches between the first and second sensors 22 and 24 is optimum; while a twelve inch spacing is ideal for a clay type soil.

To aid in assuring that the sensing means 22 and 24 are accurately positioned in the soil, the control apparatus 18 includes mounting means 100 illustrated in FIG. 2. The mounting means 100 comprises an elongated strip-like member 102 formed of an electrically insulating material. The member 102 has a plurality of spaced apertures 104 formed along its length. The apertures 104 are spaced a predetermined distance apart such as one inch, to provide a calibrated spacing for the sensors 22 and 24. Indicia 103 in the form of numeric symbols are placed adjacent to the apertures 104 to aid in selecting the correct spacing between the sensors 22 and 24.

Each of the sensors 22 and 24 has a reduced cross-section or notch portion 106 formed at one end which is removably received in one of the correspondingly shaped apertures 104 in the strip member 102. In this manner, the spacing between the sensors 22 and 24 may be precisely selected for the type of soil found within the predetermined area to be watered. Thus, in use, the first sensor 22 is emplaced in the uppermost aperture 104 in the strip member 102. The second sensor 24 is then inserted into the desired one of the remaining apertures 104 depending on the soil type. In order to sense the wilt-point moisture content of a sandy soil, the second sensor 24 is inserted into the aperture 104 calibrated for a three inch spacing from the first sensor 22. In a clay-type soil, the second sensor 22 is inserted in the aperture 104 marked for a twelve inch spacing.

The mounting means 100 thus enables a correct spacing between the sensors 22 and 24 to be selected and maintained depending on the soil type and, at the same time, insures that the sensors 22 and 24 remain in a horizontal orientation within the soil.

Low voltage conductors or wires 23 and 25 are respectively connected to the sensors 22 and 24 and are, in turn, connected to the control apparatus 18 to supply electrical power to the sensors 22 and 24.

Figure 3:
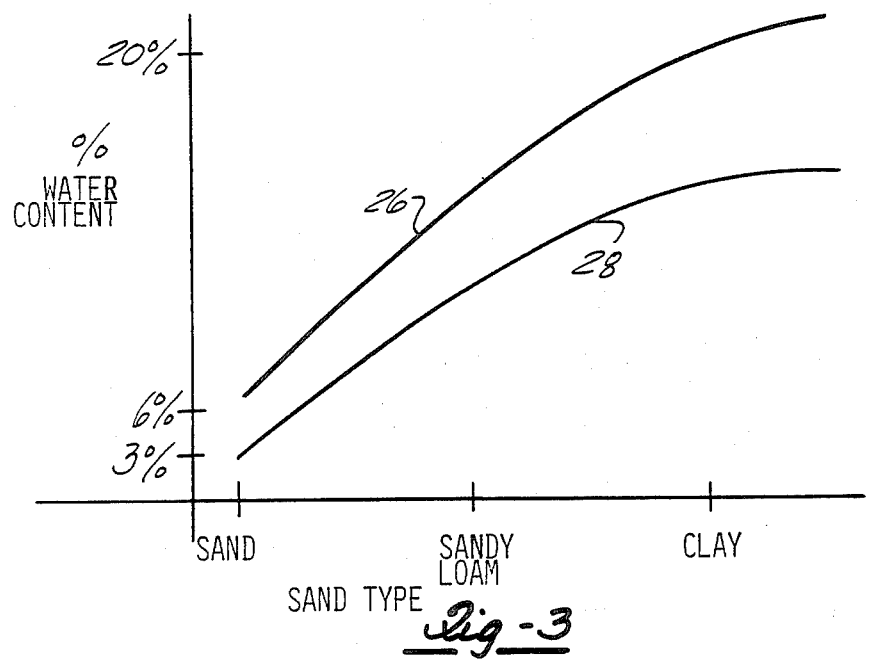
FIG. 3 is a graph depicting moisture content curves for various types of soil.

Referring now to FIG. 3, there is illustrated moisture content curves for various types of soil. The first curve 26 depicts a saturated water condition for the various types of soils in which the maximum amount of water possible is dissolved within the soil. Thus, a saturated condition exists in a sandy soil having a six percent water content and in a clay-type with approximately twenty percent moisture content.

The second, lowermost curve 28 depicts the wilt-point moisture content for the various types of soil. The wilt-point is defined as the minimum amount of moisture content within the soil which is effective for plant growth. As can be seen, the wilt-point moisture content is significantly lower than the saturated moisture content for any particular type of soil and varies from approximately three percent moisture content in a sandy soil to approximately ten percent in a clay-type soil. Moisture contents above the uppermost first curve 26 create an overwatered condition, with substantial amounts of water merely running off of the predetermined area without penetrating the soil. Conversely, moisture contents below the wilt-point curve 28 create an underwatered condition in which the plants do not receive sufficient water to maintain maximum growth.

It has been found that by providing a control apparatus for automatic sprinkler systems which is calibrated to provide water in amounts to meet the wilt-point moisture content of a particular type of soil, maximum plant growth can be achieved while maintaining efficient water usage. This concept is implemented in the circuitry illustrated in FIG. 4 which is incorporated into the control apparatus 18 of the present invention.

As described above and illustrated in FIG. 1, electrical power is applied to the control apparatus 18 through a master timer or clock 20 which connects electrical power to the control apparatus 18 at a predetermined time and for a set time period, such as from one to two hours of the day or night. Preferably, the input power is low voltage in nature, such as 24 VAC. However, if only high voltage power is available, such as 110 VAC, the control apparatus 18 may be provided with a transformer to transform the input voltage to a lower magnitude.

In either event, the input electrical power from the master clock 20 is applied to terminals 30 and 32, FIG. 4, whereon it is connected to the first and second sensor means 22 and 24. A limiting resistor 34 is provided between the first terminal 30 and the first sensor 22 to lower the voltage level of the sensors 22 and 24 approximately 18 volts. The first and second sensor means 22 and 24 are adapted to measure the impedance or resistance, hereafter referred to as resistance, of the soil located therebetween, which is proportional to the moisture content of the soil. A high resistance is indicative of a low moisture content; while a low resistance indicates a high moisture content within the soil. Depending upon the resistance measured between the first and second sensor means 22 and 24, a voltage will be produced at terminal 36 which is proportional to the measured resistance. This voltage is input through a diode 40 and resistor 42 to the negative (−) input terminal of a comparator means 38. The diode 40 and resistor 42, in conjunction with resistor 44 and capacitor 46 form a filter and rectifying circuit which rectifies the input AC power to the lower voltage DC electrical power utilized by the electronic circuitry used to construct the control apparatus 18 of the present invention. In addition, transient protection is provided by a MOV 48 which prevents high voltage spikes from entering the circuitry of the control apparatus 18.

The control apparatus 18 further includes means for establishing an electrical reference value which is related to the spacing between the first and second probes 22 and 24 and the wilt-point moisture content of the particular soil found within the predetermined area to be watered. In a preferred embodiment, the means for establishing the reference value includes a fixed resistor 50 which is connected to the positive (+) input terminal of the comparator 38. As indicated above, the value of the fixed resistor 50 is selected to establish the wilt-point moisture content level of the particular type of soil found within the predetermined area to be watered. Alternately, a variable resistance formed of a serially connected resistor 52 and potentiometer 54 is connected to the positive (+) input terminal of the comparator 38. In this manner, the reference value may be adjusted for a variety of differnet types of soil conditions.

In operation, when electrical power is applied to the control apparatus 18 by the master clock 20, as described above, a voltage will be applied to the first and second sensors 22 and 24. The magnitude of the voltage at terminal 36 will vary depending upon the resistance measured by the first and second sensors 22 and 24. If this voltage, which is applied to the (−) input terminal of the comparator 38, exceeds the magnitude of the reference voltage applied to the comparator 38, the output of the comparator 38 will be low indicating a dry soil condition. The low output on comparator 38 will allow current to flow through the LED 51 to provide an indication of the dry soil condition. Conversely, if the magnitude of the reference voltage exceeds the output of the first and second sensors 22 and 24, the output of the comparator 38 will be high indicative of a moist soil condition.

In a preferred embodiment in which the control apparatus 18 includes a single set of sensors 22 and 24 placed in the driest spot in a predetermined area, a jumper, indicated in dotted lines in FIG. 3 by reference number 53, is connected between the output of the first comparator 38 and the (−) input terminal of a second comparator 55. The output of the second comparator 54 is connected through a LED 56 to an output means 58, such as a triac. When the first comparator 38 provides a low output indicative of a dry soil condition, the second comparator 55 will switch to a high output state allowing current to flow through the LED 56 indicating a "power on" condition. The output of the LED 56 is connected to the gate of triac 58 for switching the triac 58 to a conducting state and completing the circuit between the output terminals 60 and 62 of the control apparatus 18. The output terminals 60 and 62 are adapted to be connected to the solenoid operated control valve 10 to thereby energize the control valve 10 when the senosr means 22 and 24 detect a dry soil condition. Thus, in the preferred embodiment, when the sensor means 22 and 24 detect a dry soil condition, the water control valve 10 will be energized and remain energized until the desired wilt-point moisture content of the soil has been achieved.

As shown in FIG. 4, a manually operable switch 64 is provided in series with the output terminal 62 to enable the user of the control apparatus 18 to manually energize the water control valve 10 and bypass the sensors 22 and 24.

In an alternate embodiment, the control apparatus 18 is adapted for use with a multi-position indexing water control valve. In this type of water control valve, the valve indexes between a plurality of discrete water supply conduits and consecutively connects each of the water supply conduits to the source of water on a cyclic recurring basis. In such an embodiment, the jumper wire 53 between the first and second comparators 38 and 54 is removed thereby connecting a four minute cycling timing circuit 66 between the first and second comparators 38 and 54.

In general, the four minute cycling timer circuit 66 provides a first predetermined time period in which the water control valve 10 is opened to the source of water if a dry soil condition is sensed by the sensor means 22 and 24 and a second predetermined time period in which the water control valve 10 is closed regardless of the conditions sensed by the sensor means 22 and 24 to enable the water control valve 10 to index to the next position or zone.

The timing circuit 66 includes a power up reset circuit including a comparator 68. An RC series circuit is connected to (−) input of the comparator 66 to provide a predetermined amount of time delay after power is applied to the controller 18. Preferably, the time constant of the RC circuit is selected to provide a time delay of approximately two minutes after power is applied to the controller 18. At the end of the predetermined time delay period, the comparator 68 output will switch to a high state to provide an output signal which is operative to reset the state of the flip-flops and counters utilized in the remainder of the timer circuitry 66.

At the completion of the power up time delay, a sixty cycle clock signal is applied to a counter 70 which initiates its counting operation. The counter 70 provides an output signal of approximately four to five minutes in duration at its Q14 output. This signal remains high for approximately 2.25 minutes and then switches to a low state for approximately 2.25 minutes. The Q14 output of the counter 70 is connected to the clock input of a D-type flip flop 72 which has its D input connected to the output of the first compartor 38. Thus, the low to high transition of the output signal from the counter 70 clocks the flip flop 72 and inputs the output state of the comparator 38 into the flip flop 72. The Q output of the flip flop 72 then switches to the state of the input data which is the output state of the first comparator 38. This signal will remain at the output of the flip flop 72 for the duration of the approximate 4.5 minute time period provided by the counter 70.

Thus, if a dry condition is detected by the sensors 22 and 24 which creates a low output on the comparator 38, the Q output of the flip flop 72 will correspondingly be at a low state for the duration of the 4.5 minute time period. The Q output of flip flop 72 is input to a NOR gate 74, the output of which is connected to the (−) input of a comparator 76. The output of the comparator 76 is in turn connected to the (−) input of the second comparator 55. In general, a low output from the flip flop 72, which is indicative of a dry soil condition, will cause the output of the NOR gate 74 to switch to a high state and correspondingly cause the outputs of the comparators 76 and 54 to switch to a high state closing the switch 58 and connecting electrical power to the output water control valve 10. This causes water to be dispersed over the predetermined area.

At the completion of the 4.5 minute time period, the Q14 output of the counter 70 will again switch to a high state clocking the current state of the comparator 38 into the flip flop 72. At the same time, a second flip flop 78 will be reset by the Q14 output of the counter 70. The Q10 output of the counter 70, which generates an output pulse approximately every fifteen seconds, will cause the output of NOR gate 80 to switch every fifteen seconds thereby clocking the flip flop 78 and causing its Q output to switch states once every 4.5 minutes. The Q output of flip flop 78 is connected to the input of NOR gate 74 and acts as a inhibit of approximately fifteen seconds in duration thereby holding the output of the NOR gate 74 in a low state which through the comparators 76 and 54 de-energizes the switch 58 and disconnects the water control valve 10 from the source of electrical power. This time delay enables the water control valve 10 to index to the next zone or water dispersed position. At the completion of the fifteen second time delay period, the output of the flip flop 78 will switch to the opposite state thereby removing the inhibit condition and enabling the output of the flip flop 72 to control the state of the switch 58 and the connection of electrical power to the water control device 10 as described above.

This sequence of 4.5 minute "on" time periods followed by a fifteen second "off" period is repeated as long as the sensors 22 and 24 detect a dry soil condition. As soon as sufficient moisture is applied to the predetermined area such that the moisture content has been raised to the wilt-point, the sensors 22 and 24 will indicate a wilt point moisture condition which, through the above-described circuitry, will disconnect the water control valve 10 from the source of electrical power and terminate the application of water to the predetermined area. The water control valve 10 will remain de-energized in the last water zone position until the control apparatus 18 is re-energized and senses a dry soil condition. When re-energized, the valve will begin indexing from the last water zone position. In this manner, over a period of several days, all of the zones of the multi-zone sprinkling system are supplied with equal amounts of water thereby evening out the application of water over the entire area.

Thus, there has been described a control apparatus and method for sprinkling water over a predetermined area which overcomes many of the problems of similar prior art automatic sprinkling systems. The control apparatus includes means for establishing reference values corresponding to the wilt-point moisture content of various types of soils thereby enabling precise amounts of water to be applied for maximum plant growth and efficient water usage. At the same time, the control apparatus of the present invention is simply constructed which enables it to be applied as an add on feature to existing water control systems. Furthermore, the control apparatus of the present invention is ideally suited for use with multi-zone sprinkling systems and is adapted to provide equal amounts of water to each of the zones of such a sprinkling system.

What is claimed is:

1. A control apparatus for controlling the release of water over a predetermined area comprising:
first and second sensor means for sensing an electrical resistance indicative of the degree of moisutre content of the soil within the predetermined area;
means for mounting the first and second sensor means in a horizontal or entation within the soil, with the first sensor means disposed immediately below the plant root layer and the second sensor means spaced below the first sensor means a predetermined distance related to the wilt point of moisture content of the particular type of soil within the predetermined area , the mounting means including a strip-like member having a plurality of spaced apertures formed therein, the first and second sensor means being removably insertable into selected ones of the apertures at a predetermined horizontal spacing
means for establishing an electrical reference value equivalent to the wilt-point amount of moisture content of the particular type of soil found in the predetermined area;
means for comparing the reference value and the output of the first and second sensor means; and
output means, responsive to the comparator means, for controlling the release of water to the predetermined area.

* * * * *